Patented July 26, 1927.

1,636,974

UNITED STATES PATENT OFFICE.

OBA WISER, OF EL PASO, TEXAS.

SELECTIVE FLOTATION OF MINERALS FROM CRUDE ORES.

No Drawing.   Application filed June 21, 1926. Serial No. 117,639.

This invention relates to a process for the treatment of crude ores and materials containing the mixed sulfides of metals, for example, lead, zinc and iron, or zinc and iron, whereby the sulfides of the minerals just mentioned can be released in a concentrated condition and reasonably free from one another.

The main object of the present invention is to provide for such separation or selective concentration of two or more of the sulfides in a more efficient and economical manner than has heretofore been practicable. More particularly, the main object of the invention is to separate a more readily floatable sulfide, such as lead sulfide, from less readily floatable sulfides, such as zinc sulfide and iron sulfide.

A further object of the invention is to separate zinc sulfide from iron sulfide by selective flotation.

A number of processes have been suggested and patented wherein certain chemicals or reagents have been ground with the wet ore or added to the wet ore pulp resulting from fine grinding, for the purpose of temporarily dulling one or more of the sulfide minerals to the extent that they are rendered less susceptible to flotation so that one or more of the sulfide minerals not dulled can be removed or concentrated by flotation to form a marketable product relatively free from such dulled minerals, and a suitable chemical or reagent being then added to remove the dulling effect and the pulp then subjected to a further flotation operation to float another sulfide mineral which can be marketed at a profit.

Most of the processes used for the purposes aforementioned contemplate the use of chemicals and reagents more or less expensive and in quantity such that the cost thereof per ton of crude ore treated is relatively high, as compared to the cost of the chemical or reagent that I use in my process to accomplish similar results.

I have discovered that sulfurous acid added in small quantity during the operation of grinding an ore containing lead and zinc sulfides and iron pyrite, functions to dull the zinc sulfide and the iron pyrite, so that by adding suitable oils and reagents to the pulp after grinding and then submitting the pulp, while in approximately neutral condition, to flotation, a good recovery of the lead can be made in a high grade concentrate containing very little of zinc, or iron sulfides. Then by adding a chemical or reagent to remove the dulling effect on the zinc and further subjecting the pulp to flotation, the zinc sulfide may be obtained, containing very little of either the lead or iron sulfides. Similar methods of selective flotation by the use of sulfurous acid in small quantities as a dulling agent may be used to separate lead sulfide from zinc sulfide or to separate lead sulfide from iron sulfide, as hereinafter described.

The sulfurous acid for laboratory tests can be prepared in the usual laboratory manner by decomposing sulfites of the alkali metals with a suitable acid and absorbing the sulfur dioxide in water and then determining the sulfur content.

For use in a mill on a large scale I prefer to make the sulfurous acid by burning sulfur in a suitable burner, then forcing the gas up through a tower filled with wooden blocks or other solid bodies with a shower of water descending to absorb the gas and storing it in a tank below the tower for use as required. Any other suitable method of producing sulfurous acid may, however, be employed.

United States Patent No. 1,274,505, issued to Leslie Bradford, August 6, 1918, discloses the use of sulfurous acid for dulling zinc by adding it to the ore pulp in relatively large quantities after grinding and then removing the lead and iron sulfides together by flotation. In that patent however no disclosure is made of dulling the iron pyrite, in fact, it must float in order to carry out the process, in accordance with that patent. Moreover in carrying out the process according to that patent, the flotation pulp must be strongly acid, whereas in my process of dulling both the zinc and iron sulfide, I add the sulfurous acid in a very small quantity and grind it with the ore so that the finely ground pulp is neutral or only slightly acid when it is submitted to flotation.

The proportion of sulfurous acid which I may add for the purpose of dulling zinc and iron, or zinc alone, while permitting flotation of lead, may be such as to correspond to between one-twentieth pound and one and one-half pounds of sulfur per ton of ore, but I prefer to use an amount corresponding to between one-tenth and one pound of sulfur per ton of ore. By the use of a similar proportion of sulfurous acid, followed by the addition of a suitable proportion of another agent, such as copper sulfate, a dulling effect on iron sulfide may be secured while permitting flotation of zinc sulfide, as hereinafter described.

I will now give typical examples of procedure and the results therefrom showing how my invention can be practiced.

*Example No. 1.*—4000 grams of an ore containing mixed lead and zinc sulfides was ground to pass a 65 mesh screen in a laboratory rod mill with 1,600 ccs of water containing .25 grams of sulfur in solution as sulfurous acid, also .4 grams of pine oil and .4 grams of cresylic acid.

The above charge was placed in a laboratory flotation machine and water added to make a total of 9000 ccs of water and 4000 grams of finely ground ore in the machine. The machine was then started and enough potassium xanthate in solution was added to equal .10 grams of the dry salt. A heavy lead froth was removed. After five minutes flotation .2 grams of pine oil was added and enough of the xanthate solution to equal .15 grams of the dry salt. Total time of lead flotation was 15 minutes. 3 grams of commercial copper sulfate was added to the pulp remaining in the flotation machine, also .30 grams of a mixture of one third each pine oil, hardwood creosote oil, and coal tar creosote oil. Also enough potassium xanthate in solution at intervals to equal .48 grams of the dry salt. A heavy zinc froth was removed. Total time of zinc flotation 20 minutes.

The results from this test are given in the following tabulation:

| Product. | Per cent of total. | Assays. | | Per cent recovery. | |
|---|---|---|---|---|---|
| | | Per cent Pb. | Per cent Zn. | Of Pb. | Of Zn. |
| Headings | 100.0 | 6.6 | 16.4 | 100.0 | 100.0 |
| Pb concent | 9.4 | 62.9 | 8.3 | 90.6 | 5.4 |
| Zn concent | 22.9 | 2.0 | 51.1 | 3.2 | 86.6 |
| Tailings | 67.7 | .6 | 1.9 | 6.2 | 8.2 |

*Example No. 2.*—In a mill treating 3235 tons of ore from the same mine as the crude ore of previous test the following results were obtained by flotation after grinding the ore to 8% on 65 mesh with sulfurous acid present in the operations of grinding to equal .2 lbs of sulfur per ton of ore.

| Product. | Per cent of total. | Assays. | | Per cent recovery. | |
|---|---|---|---|---|---|
| | | Per cent Pb. | Per cent Zn. | Of Pb. | Of Zn. |
| Headings | 100.0 | 9.00 | 19.61 | 100.00 | 100.00 |
| Pb concent | 10.2 | 70.25 | 8.14 | 79.01 | 4.22 |
| Zn concent | 34.2 | 3.87 | 49.52 | 14.74 | 86.49 |
| Tailings | 55.6 | .94 | 3.27 | 5.86 | 9.23 |

Much less of oils and reagents were used per ton of ore in Example No. 2 for flotation of the lead and zinc than were used in Example No. 1.

*Example No. 3.*—To illustrate one way in which my invention can be applied in making a laboratory test on a mixed lead-zinc-iron ore with gangue, wherein the lead, zinc, and iron occur in the ore as sulfides, together with a small amount of silver, the following method of procedure is given.

1420 grams of ore, crushed to pass a ½" screen was ground in a laboratory mill with 500 ccs of water containing sulfurous acid to equal .2 pounds of sulfur per ton on the ore taken. Coal tar to equal 1 lb per ton on the ore taken was also ground with the ore and water in the mill. The ore was ground so that 98% of all of it passed a 65 mesh screen. After grinding, the ore or thick pulp was diluted with water so that it contained about 30% solids. It was then put into a laboratory Spitz type flotation machine to float the lead. The sulfurous acid added as above had dulled both the iron and zinc sulfides so that only a small percentage of these minerals would float with the lead. The following oils and reagents were used to remove the lead, being added in the flotation machine containing the finely ground ore pulp diluted as stated.

To float the lead there was added blast furnace creosote oil to equal .05 lbs per ton on the ore taken, 50/50 mixture of cresylic acid and pine oil to equal .20 lbs per ton on ore taken, and potassium xanthate to equal .12 lbs per ton on the ore taken. Time required to float the lead 27 minutes.

To float the zinc there was added first, copper sulfate to equal .75 lbs per ton on the ore taken. This was added to remove the dulling effect of the sulfurous acid on the zinc sulfides so that they could be floated, giving a product high in zinc and relatively low in iron. The dulling effect of the sulfurous acid on the iron sulfides continued to hold a large percentage of them down while a large percentage of the zinc was removed. After adding the copper sulfate, a mixture of one third each, blast furnace creosote oil, hardwood creosote oil, and shale oil, was added to equal .15 lbs per ton on the ore taken, also potassium xanthate at intervals to equal .12 lbs per ton on the ore taken. Time of zinc flotation 15 minutes.

| Products. | Grams. | Assays. | | | |
|---|---|---|---|---|---|
| | | Per cent lead. | Per cent zinc. | Per cent Fe. | Ozs. Ag per ton. |
| Headings | 1420 | 9.9 | 9.7 | 28.0 | 8.0 |
| Lead conct. | 230 | 53.4 | 4.0 | 15.0 | 35.7 |
| Zinc conct. | 290 | 3.0 | 39.0 | 17.2 | 4.1 |
| Tailings | 915 | 1.8 | 1.8 | 34.3 | 2.16 |

(Results continued.)

| Products. | Percentages of recoveries. | | | |
|---|---|---|---|---|
| | Per cent lead. | Per cent zinc. | Per cent of Fe. | Per cent of Ag. |
| Headings | 100.0 | 100.0 | 100.0 | 100.0 |
| Lead conct. | 82.0 | 6.2 | 8.7 | 72.4 |
| Zinc conct. | 6.2 | 81.8 | 13.2 | 10.6 |
| Tailings | 11.8 | 11.9 | 78.1 | 17.5 |

The above assay results show the effect of adding a minute quantity of sulfurous acid to dull both the iron and zinc sulfides so that only a small percentage of these sulfides are removed while floating the lead. It will also be seen that the silver in the ore is mainly recovered with the lead. The assay results also show the continued effect of the small quantity of sulfurous acid to hold down the iron sulfides after copper sulfate has been added to remove the zinc. In the treating of certain ores it may be found advisable to slightly increase or decrease the quantity of of sulfurous acid to get the best results. The oils and reagents can also be varied to get the best results. The zinc sulfide in the ore treated as per Example No. 3 was a marmatite which only contains about 42.2% zinc when pure. The zinc concentrates made were rough concentrates which in practice may be cleaned according to my invention as shown in Example No. 5.

*Example No. 4.*—To further illustrate how a small quantity of sulfurous acid functions in my invention to dull both iron and zinc sulfides so that only a relatively small percentage of either of these sulfides will float when first removing the lead by flotation, the following results are given which were obtained in a mill treating a large tonnage of mixed lead, zinc and iron sulfides with the accompanying gangue materials. The ore was ground in two large rod mills with water enough to give a pulp discharge from the rod mills containing about 75% solids. The water used in the operation of grinding contained sulfurous acid to equal about .2 lbs. of sulfur per ton of ore being milled. The ore was ground so that 92% of it passed a 65 mesh Tyler standard sieve. It was diluted with water so that the feed to flotation contained about 34% by weight of ore and 66% by weight of water. Results obtained:

| Products. | Tons. | Assays. | | | |
|---|---|---|---|---|---|
| | | Ozs. Ag. per ton. | Per cent lead. | Per cent zinc. | Per cent iron. |
| Headings | 4095.00 | 8.1 | 9.87 | 8.97 | 28.8 |
| Lead conct. | 757.29 | 35.4 | 48.59 | 3.63 | 19.5 |
| Zinc conct. | 642.58 | 2.9 | 1.87 | 41.94 | 18.0 |
| Tailings | 2694.95 | 1.7 | .89 | 2.62 | 34.0 |

(Results continued)

| Products. | Percentage of recoveries. | | | |
|---|---|---|---|---|
| | Per cent of Ag. | Per cent of lead. | Per cent of zinc. | Per cent of iron. |
| Headings | 100.0 | 100.0 | 100.0 | 100.0 |
| Lead conct. | 80.6 | 91.07 | 7.46 | 12.5 |
| Zinc conct. | 5.6 | 2.97 | 73.33 | 9.8 |
| Tailings | 13.8 | 5.93 | 19.17 | 77.7 |

The above results were accomplished in a Spitz type flotation machine and the following oils and the following reagents were added just ahead of flotation to remove the lead by flotation:

| | Pounds added per ton of ore being treated. |
|---|---|
| Potassium xanthate | .10 |
| Cresylic acid, 97% quality | .10 |
| Steam distilled pine oil | .10 |

After the lead was removed the following oils and reagents were added just ahead of zinc flotation:

| | Pounds added per ton of ore being treated. |
|---|---|
| Copper sulfate to remove the dulling effect of the sulfurous acid | .68 |
| Potassium xanthate | .05 |
| Oil mixture, one-third each, hardwood creosote oil, blast furnace creosote oil, and shale oil | .04 |

It is observed in the table of recoveries that only 7.46% of the zinc and 12.8% of the iron was floated with the lead concentrates. The table also shows that only 9.8% of the total iron was floated with the zinc after adding the copper sulfate to remove the dulling effect of the sulfurous acid on the zinc. Thus the value of my invention is shown by the above actual mill results by first holding down a large percentage of both the iron and zinc sulfides in the ore while the lead was removed and second, continuing to hold down a large percentage of the worthless iron sulfides while the zinc was removed. The cost of the sulfur used in the dulling operation was only four-tenths of one cent per ton of ore being treated. The flotation of both the lead and zinc was accomplished in a neutral solution. In the above example the zinc concentrates were not cleaned. The zinc sulfides in the ore treated in above mill test were a marmatite, the pure mineral containing only 42.2% zinc.

*Example No. 5.*—In Examples No. 3 and 4, the zinc concentrates made were not cleaned, therefore, a test is given showing the method of cleaning according to my invention, by using a minute quantity of sulfurous acid in the operation of cleaning. A charge of the rough zinc concentrates was taken and put into a laboratory Spitz type flotation machine with a suitable quantity of water to form a pulp suitable for flotation purposes. Then enough sulfurous acid was added to equal .2 pounds of sulfur per ton on the material being cleaned (solid portion). Three ccs. of 10% copper sulfate solution was then added to remove the dulling effect of the sulfurous acid on the zinc and flotation was started. The resulting froth was a high grade zinc concentrate. No oil was added to start with as enough was already present in the pulp or rough zinc concentrates from the operation of roughing. As the oils became exhausted it was necessary to add .1 pounds per ton of ore being treated of a mixture, one third each blast furnace creosote oil, shale oil and hardwood creosote oil, also .10 lbs. of potassium xanthate per ton of ore.

The results from this operation of cleaning the rough zinc concentrates are given below to show the effect of the sulfurous acid in raising the grade of zinc concentrates by dulling the iron sulfides to the extent that a large percentage of them will be dropped in the operation of cleaning to increase the grade of the zinc concentrates.

| Products. | Grams. | Assays. | | Per cent of recoveries. | |
|---|---|---|---|---|---|
| | | Per cent zinc. | Per cent Fe. | Per cent of zinc. | Per cent of iron. |
| Headings | 640 | 37.4 | 21.2 | 100.0 | 100.0 |
| Zinc conct. | 508 | 44.2 | 16.4 | 94.4 | 61.2 |
| Tailings | 132 | 10.0 | 40.0 | 5.6 | 38.8 |

By the addition of a minute quantity of sulfurous acid in the operation of cleaning, the rough zinc concentrates were increased in grade from 37.4% zinc to 44.2% zinc which is a marketable product. The function of the sulfurous acid is to dull the iron sulfide, while the addition of copper sulfate destroys its dulling effect on the zinc sulfide and permits flotation thereof.

I claim:

1. The process of selective flotation of ores containing lead, zinc and iron sulfides, which consists in first subjecting the ore pulp containing ore in divided condition to the action of a dulling agent comprising sulfurous acid, in proportion corresponding to less than one and one-half pounds and more than one twentieth pound of sulfur per ton of ore, and then subjecting the ore pulp while in approximately neutral condition, to flotation and to float the lead sulfide while retaining the zinc and iron sulfides largely in the pulp.

2. The process of selective flotation of ores containing lead, zinc and iron sulfides, which comprises first subjecting the ore pulp containing ore in divided condition to the action of a dulling agent comprising sulfurous acid, in proportion corresponding to less than one and one-half pounds of sulfur per ton of ore, and then subjecting the ore pulp while in approximately neutral condition to flotation to float lead sulfide while retaining zinc and iron sulfides largely in the pulp, and then subjecting the residual ore pulp to the action of an agent tending to counteract the dulling effect of the dulling agent on zinc sulfide and again subjecting the ore pulp to flotation to float zinc sulfide while leaving iron sulfide largely in the tailings.

3. The process of selective flotation of ores containing sulfides of lead, zinc and iron which comprises subjecting pulp containing the ore in suitably divided condition to the action of a dulling agent comprising sulfurous acid containing from one tenth pound to one pound of sulfur per ton of ore, then subjecting the ore pulp to flotation to float the lead sulfide, then treating the ore pulp with copper sulfate to remove the dulling effect on the zinc sulfide and subjecting the ore pulp to further flotation to float zinc sulfide while leaving iron sulfide largely in the tailings.

4. The process of selective flotation of ores containing lead, zinc and iron sulfides which comprises subjecting pulp containing the ore in suitably divided condition to the action of a dulling agent comprising sulfurous acid containing from one tenth pound to one pound of sulfur per ton of ore, then subjecting the ore pulp in substantially neutral condition to flotation to float the lead sulfide, then treating the ore pulp with copper sulfate to remove the dulling effect on the zinc sulfide and subjecting the ore pulp to further flotation to float zinc sulfide while leaving iron sulfide largely in the tailings.

5. The process of recovery by flotation of lead, zinc and iron sulfides from materials containing the same, which comprises subjecting pulp containing such material in suitably divided condition to the action of a dulling agent comprising sulfurous acid containing from one-tenth pound to one pound of sulfur per ton of such material, then subjecting the pulp while in approximately neutral condition to flotation to float the lead sulfide, then treating the pulp with copper sulfate to remove the dulling effect on the zinc sulfide and subjecting the ore pulp to further flotation to float a concentrate containing zinc sulfide together with a portion of the iron sulfide, while retaining the iron sulfide largely in the pulp, then forming a pulp of the zinc sulfide concentrate, adding to the pulp so formed a further quantity of sulfurous acid containing from one-tenth pound to one pound of sulfur per ton of solids in the concentrate, then treating the pulp with copper sulfate to remove the dulling effect on the zinc sulfide, and then subjecting the pulp to further flotation to float zinc sulfide while retaining in such pulp a large proportion of the iron sulfide.

6. In the process of selective flotation of material containing zinc and iron sulfides, the step which consists in subjecting pulp containing such sulfides in suitably divided condition to the action of a dulling agent comprising sulfurous acid containing from one-tenth pound to one pound of sulfur per ton of solids in the pulp, then treating the pulp with copper sulfate to remove the dulling effect of said dulling agent on the zinc sulfide, and then subjecting such pulp to flotation to float zinc sulfide while retaining in the pulp a large proportion of the iron sulfide.

In testimony whereof I have hereunto subscribed my name this 10th day of June, 1926.

OBA WISER.